E. J. KAIER.
TANK VALVE.
APPLICATION FILED MAY 15, 1917.
1,265,670.
Patented May 7, 1918.
2 SHEETS—SHEET 1.
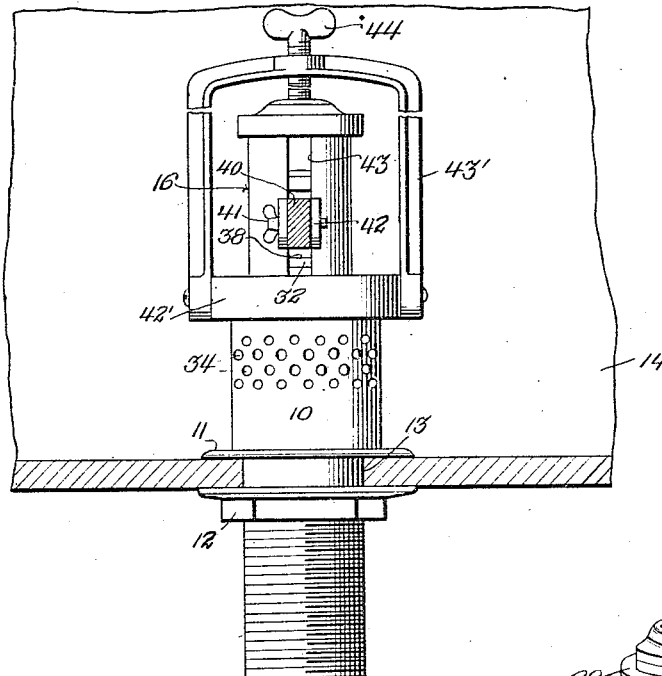
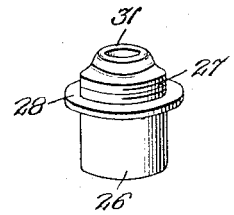
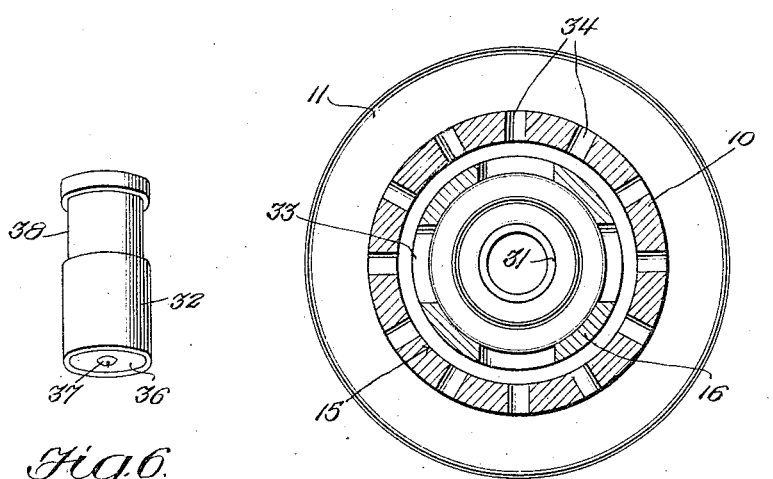
INVENTOR
E. J. Kaier,
BY Victor J. Evans
ATTORNEY
WITNESSES
J. H. Crawford
T. L. Rochester

E. J. KAIER.
TANK VALVE.
APPLICATION FILED MAY 15, 1917.

1,265,670.

Patented May 7, 1918.
2 SHEETS—SHEET 2.

WITNESSES
J. H. Crawford
T. L. Roelofel

INVENTOR
E. J. Kaier,
BY Victor J. Evans
ATTORNEY

UNITED STATES PATENT OFFICE.

EDWARD J. KAIER, OF MAHANOY CITY, PENNSYLVANIA.

TANK-VALVE.

1,265,670.     Specification of Letters Patent.     Patented May 7, 1918.

Application filed May 15, 1917. Serial No. 168,819.

*To all whom it may concern:*

Be it known that I, EDWARD J. KAIER, a citizen of the United States, residing at Mahanoy City, in the county of Schuylkill and State of Pennsylvania, have invented new and useful Improvements in Tank-Valves, of which the following is a specification.

This invention relates to valves and particularly to float operated valves adapted for use in connection with flush tanks and the like.

The primary object of the invention is the provision of means for automatically cutting off the supply of water in the tank, when it is desired to remove the valve for any purpose, thereby obviating the necessity of cutting off the water by means of the usual manually operated stop cock.

A further object of the invention is the provision of a valve in which all of the operating parts are contained within a removable section of the valve casing, for the purpose of permitting the removal of these parts to repair the valve, the stationary section of the casing being provided with automatic cut-off means which is operable upon the removal of the removable section, so that the flow of water is immediately stopped.

A still further object of the invention is to provide a valve casing which includes a stationary section and a removable section, the said removable section carrying the float operated valve and its seat and also having a projection, which is adapted to be inserted in the passage of the stationary section to hold the automatic cut-off means in the inoperative position, and upon the removal of the removable section to permit the said automatic cut-off means to automatically close the passage through the valve casing to cut off the water supply in the tank.

A still further object of the invention is to provide an automatically operated float valve in which the flow of water is evenly distributed over the top surface of the valve seat causing wear over the entire surface and preventing it from wearing out in one particular point, thereby insuring an even seat for the valve.

Still another object of the invention is the provision of a valve casing which includes a stationary section and a removable section with means carried by the removable section for quickly and conveniently securing it in position within the stationary section.

Other objects and advantages of the invention will appear as the following description is read in connection with the accompanying drawings, in which—

Figure 1 is a side elevation of a valve embodying the present invention shown positioned within the bottom portion of a tank, a fragmentary portion of the tank only being shown;

Fig. 5 is a transverse sectional view of the line 5—5 of Fig. 2;

Fig. 6 is a detailed perspective view of the float operated valve;

Fig. 7 is a similar view of the auxiliary valve; and

Fig. 8 is a like view of the member provided with the valve seat.

Referring to the drawings in detail, like characters of reference indicate corresponding parts through the several views.

Figure 2:
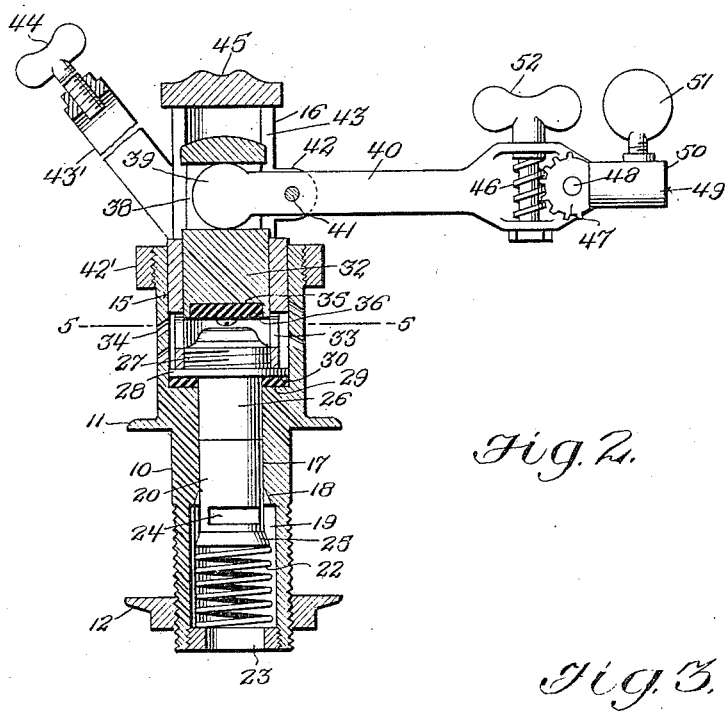
Fig. 2 is a central vertical sectional view through the valve casing, and its operating parts.
Figure 4:
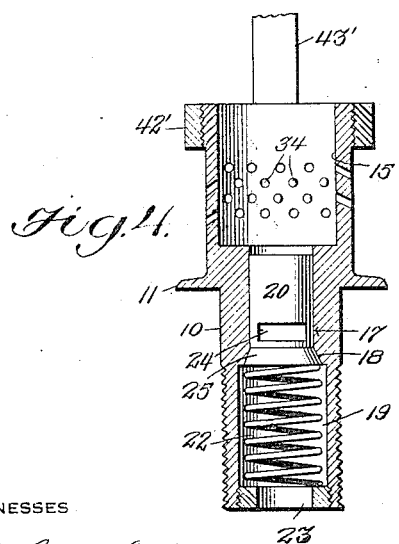
Fig. 4 is a central vertical sectional view through the stationary section of the valve casing with the removable section removed therefrom, illustrating the manner in which the automatically operated auxiliary valve cuts off the supply of water.
Figure 3:
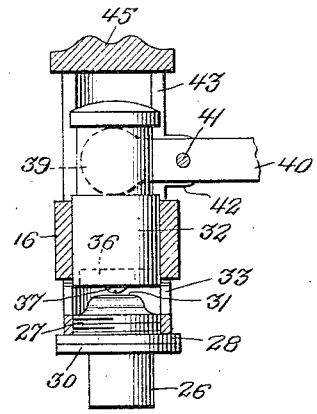
Fig. 3 is a similar view through the removable section of the valve casing, with its operating parts shown in elevation.

In repairing or replacing worn or defective valves, especially of the float operated type used in connection with flush tanks, it is necessary to cut off the supply of water to the tank by means of a manually operated stopping cock, which is often located in the cellar of the building, necessitating frequent trips from the said valves to the stopping cock for the purpose of turning on the water to ascertain whether the repaired or newly installed valve is leakproof.

In order to overcome these difficulties the following described invention is provided. In the form of the invention herein illustrated there is provided a valve casing, which includes a stationary section 10, which carries a flange 11, which is adapted to coöperate with the jam nut 12 for the purpose of securing the valve casing within the opening 13 of the tank or receptacle 14. The casing 10 is concentrically bored to provide a chamber 15, within which is received the removable section 16 of the valve casing. The stationary section is further provided with a restricted passage 17, which is provided with a flared seat 18, merging into a passage 19 of relatively greater diameter.

Slidably mounted within the passage 17 is a hollow plunger 20, which is open at one end and closed at its opposite end as shown at 21. This plunger is normally urged within the passage 17 by means of a spring 22, which is interposed between the closed end 21 of the plunger and the collar 23 located within the passage 19. The plunger 20 is formed with radially disposed openings 24 in its side walls, which communicate with the bore of the plunger and is further formed with a flared portion 25, which is adapted to fit the seat 18 for the purpose of cutting off the supply of water to the passage 17, the openings 24 being so located that when the plunger is seated, they will be within the passage 17.

In order to normally hold the plunger 20 in an inoperative position, so as to permit the passage of the water through the valve casing, the removable section 16 of the casing is provided with an extension 26, said extension being threaded into the remaining portion of the removable section as shown at 27. The extension 26 is provided with an annular flange 28, which is adapted to seat against the bottom of the said remaining portion of the section 16 and interposed between this flange and the seat 29 formed in the chamber 15 is a washer 30, which provides a water tight joint between the sections 10 and 16 of the valve casing. The extension 26 is hollow as shown for the purpose of permitting the passage of water therethrough and is formed with a valve seat 31, which is adapted to be engaged by a float operative valve 32 for the purpose of closing the opening through the extension to cut off the supply of water. This valve seat entirely surrounds the opening through the extension and provides for an even distribution of water over the seat, thereby preventing the action of the water from wearing the seat out in one point.

Section 16 is provided with radially arranged openings 33, which when the valve is assembled will register with openings 34 provided in the stationary section casing to permit the passage of the water therethrough.

The valve 32 is formed with a seat 35, which is adapted to receive a washer 36, which is secured therein by means of a screw 37, which when the valve is closed is adapted to contact with the seat 31. This construction permits of the convenient removal of the worn washer and the substitution of a new one when necessary.

The valve 32 is provided with a slot 38, which is adapted to receive the rounded end 39 of a lever 40, the said lever being provided with a set screw 41 between ears 42 located upon each side of a slot 43 formed in the removable section 16.

Threaded upon the stationary section 10 is a collar 42', upon which is pivoted a yoke 43' which carries a set screw 44 which is adapted to be engaged in a depression 45 formed in the upper end of the section 16 and by means of which the said section is held in assembled position.

Located upon the outer end of the lever 40 is an adjusting worm 46, which is engaged by a toothed segment 47, which is pivotally mounted as at 48 upon the extremity of the lever 40. The segment 47 carries an extension 49 which is provided with a socket 50, for the reception of the end of the rod which carries the float (not shown). The extension 49 is provided with a set screw 51, by means of which the rod is secured in position within the socket 50. For the purpose of adjusting the worm 46, one of its ends is provided with a thumb piece 52 so that by adjusting this worm the height of the float may be regulated to provide for the proper movement of the valve 32 in its operation.

From the foregoing description and the accompanying drawings, it is readily seen that the yoke 43 may be swung to one side for the purpose of removing the removable section 16 of the valve casing, which carries with it the valve 32, said valve seat 31 and the extension 26, all of these parts being easily removed and taken apart for the purpose of repairing the same. It will also be seen that upon the removal of the valve section 16 with its extension 26, the action of the spring 22 will immediately force the plunger 20 against the seat 18 and cut off the supply of water from the valve casing. Upon the insertion of section 16, the plunger 20 will be immediately forced from the seat 18 to reëstablish communication through the plunger.

Having described the invention, what is claimed is:

1. A valve embodying a hollow casing provided with an entrance passage, a valve chamber and a restricted passage establishing communication between the said passage and chamber, a valve seat located at the entrance of the restricted passage within the entrance passage, a hollow valve for said seat, said valve having a stem projecting within and guided by the restricted passage, a spring within the entrance passage to force the valve upon its seat, a valve carrying section removably secured within the casing and a valve seat carried by the removable section and having a stem also projecting into the restricted passage for engagement with the stem of the first mentioned valve to operate the latter against the action of the spring.

2. A valve embodying a hollow casing provided with an entrance passage, a valve chamber and a restricted passage establishing communication between the entrance passage and said chamber, a spring operated valve in said entrance passage adapted to close said restricted passage, said valve having a stem projecting into the restricted passage, a supplemental valve removably located within the valve chamber, and a hollow stem providing a seat for the supplemental valve, said stem projecting within the restricted passage to unseat the first mentioned valve.

In testimony whereof I affix my signature.

EDWARD J. KAIER.

Copies of this patent may be obtained for five cents each, by addressing the "Commissioner of Patents, Washington, D. C."